Jan. 9, 1934.  E. GRAF  1,942,645
VENT PLUG FOR STORAGE BATTERIES
Filed June 11, 1931
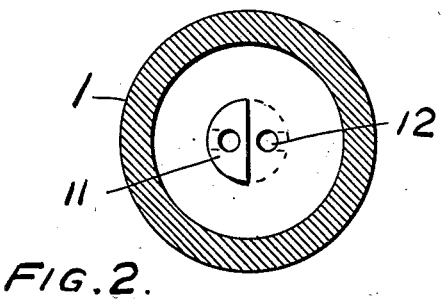
FIG. 2.
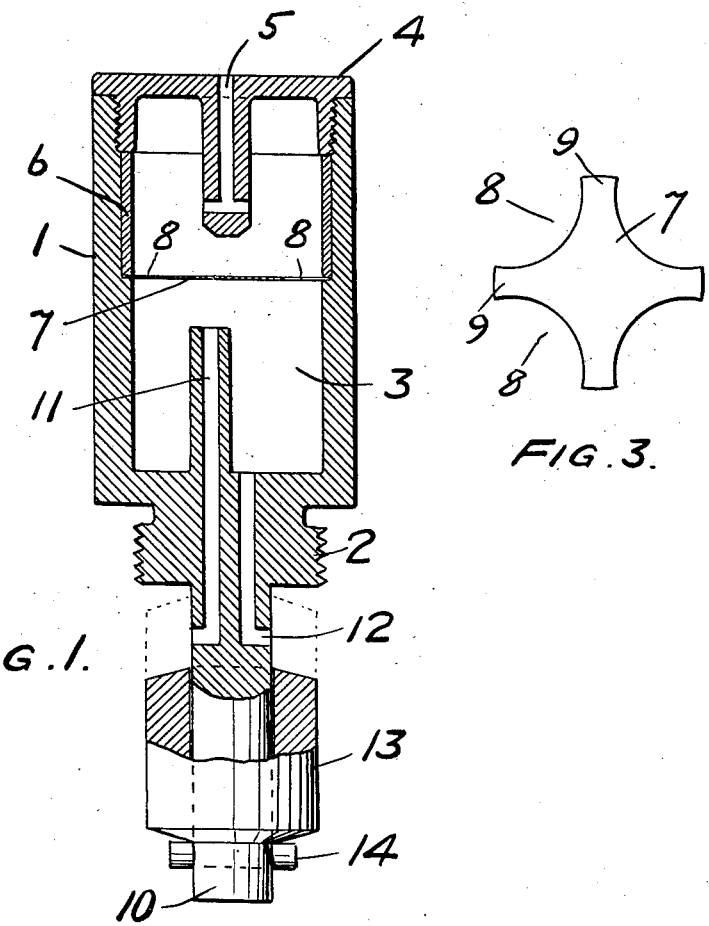
FIG. 1.
FIG. 3.
WITNESS:
INVENTOR
Ernest Graf
BY Augustus B. Stoughton
ATTORNEY.

Patented Jan. 9, 1934

1,942,645

UNITED STATES PATENT OFFICE 1,942,645

VENT PLUG FOR STORAGE BATTERIES

Ernest Graf, Philadelphia, Pa., assignor to The Electric Storage Battery Company, Philadelphia, Pa., a corporation of New Jersey Application June 11, 1931. Serial No. 543,609

3 Claims. (Cl. 136—178)

The subject of my invention is a vent plug for storage batteries which prevents spilling of electrolyte from the storage battery when it is tipped.

My device consists of a vent plug having a hollow chamber therein, an outlet vent projecting downward into said chamber, a cell vent projecting upward into said chamber, a drain opening from the bottom of said chamber into said cell, a baffle in said chamber between said outlet vent and said cell vent, and a valve for simultaneously controlling said cell vent and said drain and adapted to be actuated by gravity when the storage battery is tipped or inclined at an angle to the vertical.

For a further exposition of my invention reference may be had to the annexed drawings and specification at the end whereof my invention will be specifically pointed out and claimed.

In the drawing,

Figure 1 is a side elevation of my device with parts shown in vertical cross section.

Figure 2 is a horizontal cross section through my device, and

Figure 3 is a plan view of an element of my device.

In the embodiment chosen for illustration in the drawings, there is shown a vent plug generally indicated at 1 and suitable for use with electric storage batteries. This vent plug has screw threads 2 or other convenient means for attaching it into the filling opening of a storage battery cell. The vent plug 1 has in its central part a chamber generally indicated at 3. The chamber 3 is of sufficient size to receive and contain a certain amount of electrolyte in case this escapes from the cell before the means for preventing such escape operates. This electrolyte is allowed to drain back into the cell when the battery regains its normal position. At the top of the vent plug there is provided a cap 4 having an outlet vent 5 therein which projects downwardly into chamber 3. Cap 4 has screw threaded or other convenient engagement with the vent plug 1 so as to be detachable therefrom. Cap 4 also serves to retain in place a ring shaped member 6 which in turn secures a baffle 7 in the chamber 3. Baffle 7 is of generally cruciformed or other many pointed shape having openings 8 between the arms 9 of the member of the baffle. At its lower end vent plug 1 has a neck 10 which projects into the storage battery cell and which has in it a cell vent 11 which projects up into chamber 3. Neck 10 also has in it a drain 12 which leads from the bottom of chamber 3 into the cell. All the foregoing parts are vulcanite or similar acid resisting and light material. Cell vent 11 and drain 12 are controlled by means of valve 13 which is slidably mounted on neck 10 and retained thereon between the screw threads 2 and the pin 14. Valve 13 is conveniently made of lead or other heavy acid resisting material.

In use the vent plug is screwed into or otherwise fastened to the filling opening of a storage battery cell (not shown). When the cell or battery is in vertical position the valve 13 occupies the position shown in full lines in Figure 1 and the cell vent 11 and the drain 12 are in communication with the chamber 3 and are above the normal level of the electrolyte in the cell. The gases given off by the battery may, therefore, vent from the cell through cell vent 11 into chamber 3 whence they baffle around baffle 7 through openings 8 therein and escape through the outlet vent 5 to the air. Any entrained acid or other liquid in these gases condenses or drops from the gas on the baffle 7 or on the walls of chamber 3 and thence falls through drain 12 back into the cell. If the battery is tipped or tilted at an angle to the horizontal when this angle becomes greater than 90° the valve 13 slips on neck 10 into the position shown in dotted lines in Figure 1 in which position it closes the cell vent 11 and the drain 12 and thereby prevents the escape of electrolyte from the cell. When the battery is restored to normal position the valve 13 slips back to its normal position and once again opens the cell vent 11 and the drain 12.

I do not intend to be limited in the practice of my invention save as the scope of the prior art and of the attached claims may require.

I claim:

1. A vent plug for a storage battery, said vent plug having a chamber therein, an outlet vent projecting downward into said chamber, a cell vent projecting upward into said chamber above the level of the bottom of said chamber, a baffle in said chamber between said cell vent and said outlet vent, a drain from said chamber to said battery separate from said cell vent, and a reciprocating valve actuated by gravity simultaneously closing said cell vent and said drain when the battery is tipped.

2. A vent plug for a storage battery, said vent plug having a chamber therein, an outlet vent from said chamber, a drain from said chamber to said battery, a cell vent from said battery terminating in the chamber above the drain, and a valve actuated by gravity controlling said cell vent and said drain.

3. A vent plug for a storage battery, said vent plug having a chamber therein, an outlet vent leading from said chamber, a cell vent leading from said battery into said chamber, a baffle in said chamber between said cell vent and said outlet vent, a drain from said chamber to said battery, a neck on said plug projecting into said battery and having said outlet vent and said drain in it, and a valve of heavy material mounted on said neck for reciprocation by gravity when the battery is tipped to shut off said outlet vent and said drain from the battery.

ERNEST GRAF.